United States Patent [19]

Kolar

[11] Patent Number: 4,685,704
[45] Date of Patent: Aug. 11, 1987

[54] CUFF FOR SEALING JOINTS OF PIPES

[75] Inventor: Robert Kolar, Vaduz, Liechtenstein

[73] Assignee: Steinburg Aktiengesellschaft, Vaduz, Liechtenstein

[21] Appl. No.: 779,771

[22] PCT Filed: Jan. 16, 1985

[86] PCT No.: PCT/EP85/00011
§ 371 Date: Oct. 30, 1985
§ 102(e) Date: Oct. 30, 1985

[87] PCT Pub. No.: WO85/03338
PCT Pub. Date: Aug. 1, 1985

[30] Foreign Application Priority Data

Jan. 20, 1984 [DE] Fed. Rep. of Germany ....... 3402325

[51] Int. Cl.4 .......................................... F16L 33/16
[52] U.S. Cl. .................... 285/109; 285/235; 285/236; 285/370; 285/397
[58] Field of Search .............. 285/109, 235, 370, 397, 285/236, 258

[56] References Cited

U.S. PATENT DOCUMENTS

| 3,521,913 | 7/1970 | Verhein et al. | 285/109 |
| 3,558,164 | 1/1971 | Havell | 285/236 |
| 4,346,922 | 8/1982 | Ohtsuga et al. | 285/109 |
| 4,426,106 | 1/1984 | McCoy | 285/236 |

FOREIGN PATENT DOCUMENTS

| 2814497 | 10/1979 | Fed. Rep. of Germany | 285/370 |
| 1200225 | 7/1970 | United Kingdom | 285/370 |
| 2038976 | 7/1980 | United Kingdom | 285/370 |
| 2042118 | 9/1980 | United Kingdom | 285/109 |

Primary Examiner—Richard J. Scanlan, Jr.
Attorney, Agent, or Firm—Mark P. Stone; Davis, IV: F. Eugene

[57] ABSTRACT

The invention relates to a cuff for sealing joints of pipes, adhering inside at the two ends of pipes by a plurality of annular ribs formed in one piece with the rest of the cuff, made of elastic material and which is being pressed outwardly by expanding collars on its inner side in the region of the annular ribs. The invention is to be seen therein that in the unloaded state the profile of the annular ribs (1) forms in cross-section two curvatures (1a, 1b) towards the pipe wall. Thus it is achieved that the cuff retains its required position after it has been inserted into the pipe ends and being pressed slightly against the wall ends. Furthermore, a good sealing effect is being achieved by the new configuration of the annular ribs.

10 Claims, 2 Drawing Figures

CUFF FOR SEALING JOINTS OF PIPES

The invention relates to a cuff for sealing joints of pipes, adhering inside at the two ends of pipes by a plurality of annular ribs, formed in one piece with the rest of the cuff, made of elastic material and which is pressed outwardly by expanding collars on its inner side in the region of the annular ribs.

Preferably the pipes are passable.

At known cuffs of this kind (GB-PS No. 20 38 976, GB-PS No. 12 00 225) the profile of the ribs in the cross-section and in an unloaded state describes a steady curve curved away from the pipe wall to the center of the curve. If one inserts the cuff loosely into the pipes (in order to press it afterwards against the pipes by means of the expanding collars) the upper part of the cuff must be held in place since on the other hand it would collapse. This also applies if it had been pressed before by hand towards the pipe wall.

It is the task of the invention to develop the cuff mentioned above in a way that it keeps its required position after it has been inserted loosely into the pipes and pressed against the pipe wall by hand.

According to the invention this task is solved in that in its unloaded state the profile of the annular ribs forms in cross-section two curvatures towards the pipe wall.

If such a cuff is put into the pipes and is pressed by hand against the pipe walls, it keeps its position due to the fact that the annular ribs adhere to the pipe wall (which has been smoothed by grinding in the region of the sealing) by sucking:

During the pressing process the two curvatures allow some air to escape from the space between them. If subsequently the cuff is released in this space there originates a certain vacuum which holds the cuff. This is different in the known case. Here the air cushion between the pipe wall and rib is larger than in the present case. Thus it can be compared with a soft or elastic spring. In consequence the annular ribs can move easier at a change of force for instance in case that they are left alone after a first pressing than in the case according to the invention. Such movements, however, lead to a shifting with the consequence that air can enter into the hollow space. The vacuum which exists there first is being reduced and the cuff cannot be kept in place.

A further advantage is that the cuff according to the invention has a better sealing effect than the known one: At pressure by the expanding collars the pre-curved regions of the ribs are pressed into the finest grooves and recesses of the pipe wall, in fact deeper and over a larger area than in the known case the corresponding rib surfaces, this for the following reason: As against the known solution the areas of the ribs that first meet the pipe wall cannot evade laterally.

A further development of the invention consists therein that the annular ribs in their unloaded state have such a distance from each other that they do not touch each other in the loaded state. This further improves the sealing effect.

It is further expedient according to the invention that on both sides of the annular ribs with two curvatures there is located one ring rib each, the surface orientated towards the pipe wall of which forms a curve in cross-section, which is a straight line or approximately a straight line.

It is advantageous if this curve in the unloaded state of the cuff extends in oblique direction from the pipe wall, starting from its end facing the other annular ribs.

It is exteremely advantageous however if this curve in the unloaded state of the cuff, starting from the end facing the other ring ribs, extends in oblique direction towards the pipe wall.

It is also advantageous if in the unloaded state of the cuff the flanks of the outer ring ribs extend parallely and obliquely to the pipe wall and to the other ribs.

A further development of the invention consists therein that the flanks of the outer ring ribs facing the other ribs are located in the height of the edges of the expanding collar. If the expanding collar is being pressed onto the cuff and the cuff is thus being pressed against the pipe wall, the outer ring ribs shift somewhat in a way that their sealing surface is pressed firmly against the pipe wall.

It is further proposed that the ribs with two curvatures broaden conically towards their base parts. The sealing surfaces facing the pipe wall are thus pressed vertically against the pipe wall at increasing pressure, oblique forces which could lead to a lateral evading of the sealing surface do not originate.

Finally it is practical that the outer ring ribs in an unloaded state have such a distance from the adjacent ribs that these and the latter do not touch each other in the loaded state.

Further details of the invention can be seen from the drawing wherein

Figure 1:
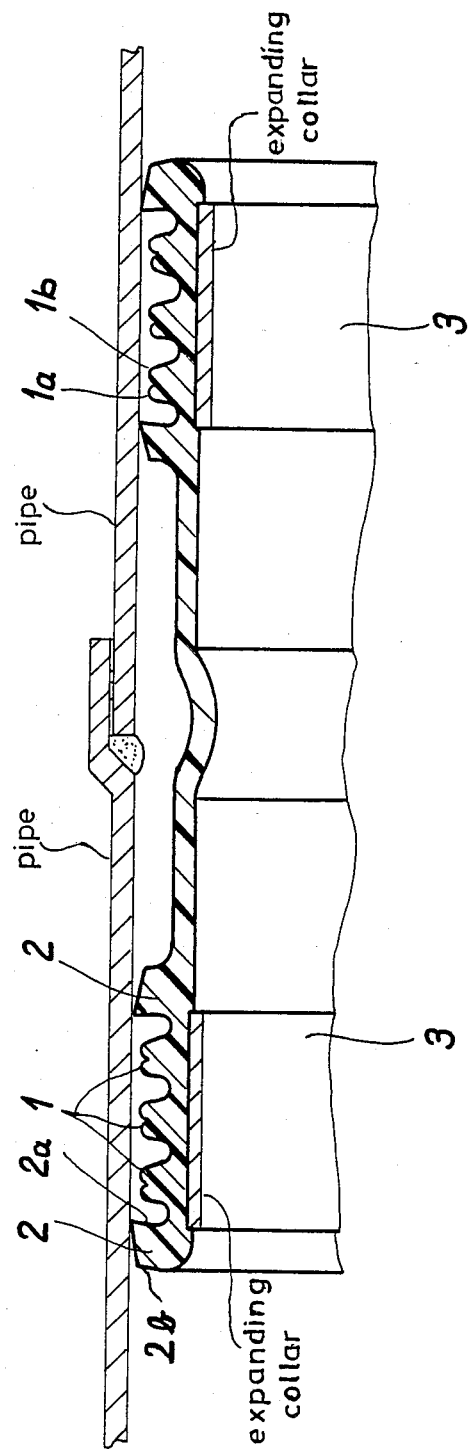
FIG. 1 shows a part of the cuff according to the invention in sectional view.

The cuff shown in FIG. 1 has three annular ribs 1 on each side. These form two curvatures 1a,1b, each. On the two sides of the ribs 1 a further ring rib is located the flank 2a of which is higher than the flank 2b. 3 are flat grooves on the inner side of the cuff in which not represented expanding collars rest which press the ribs 1,2 outwardly against the inner walls of not shown pipe ends.

Figure 2:
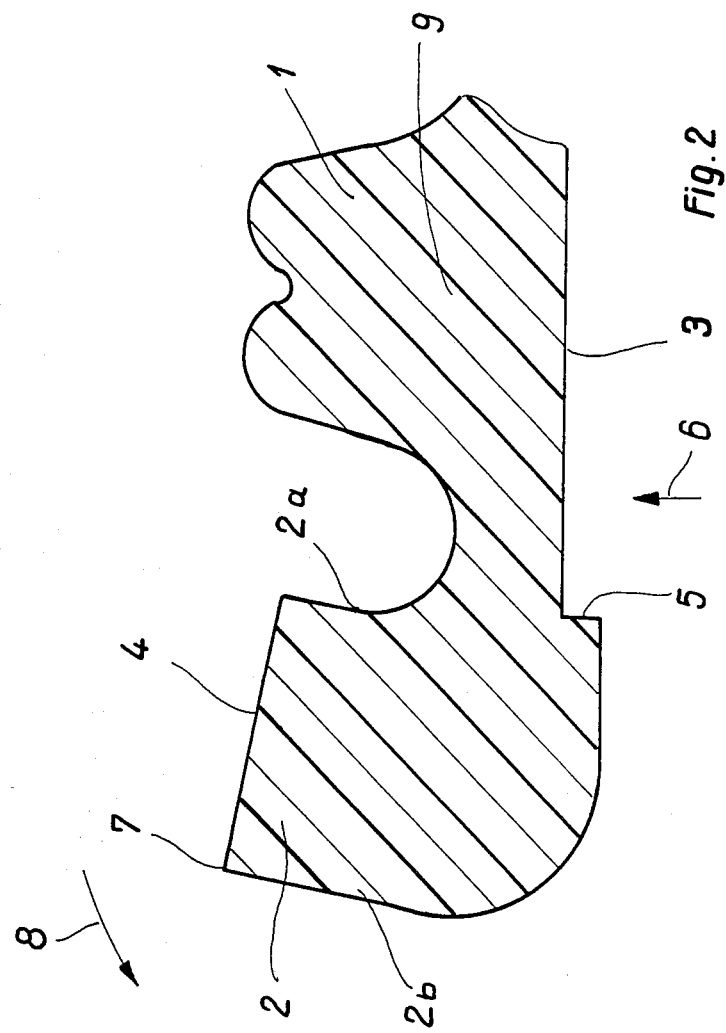
FIG. 2 shows the left end of the cuff according to FIG. 1 in another embodiment of the invention.

FIG. 2 shows the left end of the cuff piece shown in FIG. 1 in another embodiment. The flanks 2a,2b are parallel and extend obliquely. Furthermore, the region 4 extends opposite obliquely to the corresponding region of the embodiment according to FIG. 1. Edge 5 of groove 3 in which the expanding collar rests is situated approximately below flank 2b (with reference to FIG. 2). If the expanding collar is expanded in a way that a force according to arrow 6 is being exercised on the cuff, edge 7 shifts approximately according to arrow 8 and as a result region 4 bears firmly against the pipe wall due to a corresponding pressure. The annular ribs are formed in one piece with the rest of the cuff from elastic material.

Rib 2 on the other side of the ribs 1 is formed correspondingly which means that its sealing surface, too, extends oblique from the pipe wall to the adjacent annular ribs.

The annular ribs 1 broaden towards their base parts 9.

I claim:

1. A cuff for internally sealing joints defined between adjacent ends of pipes to be joined together, said cuff including an annular body having on each end a plurality of annular ribs extending outwardly therefrom, said annular body and said plurality of annular ribs being formed in one piece from an elastic material, said cuff adapted to be pressed against the inner walls of said pipes by an expanding collar received within the cuff on its inner side in the region of said annular ribs, said plurality of annular ribs each forming a profile in cross-section having two curvatures oriented towards the walls of said pipe when said annular ribs are in their unloaded state.

2. The cuff of claim 1 wherein said plurality of adjacent annular ribs are separated a sufficient distance from each other so that they do not come into contact with each other in their loaded state.

3. The cuff of claims 1 or 2 wherein at least three adjacent annular ribs are defined on said annular body.

4. The cuff of claims 1 or 2 including one ring rib provided on each side of said plurality of annular ribs so that said plurality of annular ribs is disposed between said ring ribs.

5. The cuff of claim 4 wherein each ring rib includes two opposed flanks and a substantially planar surface defined between the flanks and oriented towards said pipe walls.

6. The cuff of claim 5 wherein said planar surface extends in a direction oblique to the pipe walls when said cuff is in an unloaded state.

7. The cuff of claim 5 wherein the flanks of each of said ring ribs extend parallel and oblique to the pipe walls and to the annular ribs when said cuff is in an unloaded state.

8. The cuff of claim 6 wherein one of the flanks of said ring ribs is proximate to an edge of a groove defined in said annular body for receiving said expanding collar.

9. The cuff of claim 1 wherein each of said annular ribs joins said annular body at a base part and is conically broadened in a direction towards said base part.

10. The cuff of claim 4 wherein each ring rib, in its unloaded state, is separated from the nearest adjacent annular rib so that said ring ribs and said annular ribs do not come into contact when said ring ribs and said annular ribs are in their loaded state.

* * * * *